United States Patent
Epp et al.

(10) Patent No.: US 6,594,864 B2
(45) Date of Patent: Jul. 22, 2003

(54) CUSHIONING DEVICE FOR ROTATABLE COMPONENTS, SUCH AS, FOR EXAMPLE, ROOF GRAB HANDLES OR SUN VISORS OF A VEHICLE

(75) Inventors: Verena Epp, Weiler (DE); Uwe Luksch, Maulbronn (DE)

(73) Assignee: Utescheny AG, Zaisenhausen (DE)

( * ) Notice: Subject to any disclaimer, the term of this patent is extended or adjusted under 35 U.S.C. 154(b) by 0 days.

(21) Appl. No.: 10/269,752

(22) Filed: Oct. 7, 2002

(65) Prior Publication Data

US 2003/0037414 A1 Feb. 27, 2003

Related U.S. Application Data

(63) Continuation of application No. PCT/DE01/01425, filed on Apr. 11, 2001.

(30) Foreign Application Priority Data

Apr. 15, 2000 (DE) ..................................... 200 06 953 U

(51) Int. Cl.$^7$ ........................... A45C 13/22; E05D 11/08
(52) U.S. Cl. ............................. 16/438; 16/445; 16/431; 16/342; 16/280; 16/296; 16/300; 16/54
(58) Field of Search .................... 16/438, 412, 445, 16/431, 342, 337, 341, 332, 280, 284, 296, 300, 305, 307, 54; 296/210, 214, 97.9, 97.1, 97.8; 188/83, 290, 82.7, 72.7

(56) References Cited

U.S. PATENT DOCUMENTS

| | | | | |
|---|---|---|---|---|
| 4,186,905 A | * | 2/1980 | Brudy | 248/478 |
| 5,109,572 A | * | 5/1992 | Park | 16/334 |
| 5,210,905 A | * | 5/1993 | Dietz et al. | 16/429 |
| 5,364,149 A | * | 11/1994 | Aymerich et al. | 296/97.12 |
| 5,645,308 A | * | 7/1997 | Fink | 296/97.9 |
| 5,918,348 A | | 7/1999 | Carpenter et al. | 16/342 |
| 6,182,330 B1 | * | 2/2001 | Novin et al. | 16/341 |
| 6,349,449 B1 | * | 2/2002 | Kuehl | 16/342 |
| 6,397,435 B1 | * | 6/2002 | Gosselet | 16/438 |

FOREIGN PATENT DOCUMENTS

| | | | |
|---|---|---|---|
| DE | 41 25 184 | 2/1993 | ............ E05F/5/06 |
| DE | 93 14 645.0 | 1/1994 | ............ B60N/3/02 |
| DE | 296 04 260 | 6/1996 | ............ B60N/3/02 |
| DE | 298 08 330 | 8/1998 | ............ A45C/13/26 |
| DE | 298 09 432 | 9/1998 | ............ B60J/3/02 |
| DE | 10038454 A1 | * 2/2002 | |
| EP | 0 569 022 | 8/1996 | ............ B60N/3/02 |
| JP | 08291667 A | * 11/1996 | |
| JP | 09041781 A | * 2/1997 | |

* cited by examiner

Primary Examiner—Chuck Y. Mah
(74) Attorney, Agent, or Firm—Darby & Darby

(57) ABSTRACT

A cushioning device (10, 10.1) for rotatable components such as, for example, roof grab handles or sun vizors of a vehicle, having an outer rotational sleeve (14) and an inner rotational part (12), which are both arranged in a manner such that they can rotate relative to each other about a common axis of rotation (16) from a first rotational position into a second rotational position, either the inner rotational part (12) being fixed and the outer rotational sleeve (14) being rotatable or the outer rotational sleeve being fixed and the inner rotational part being rotatable, is distinguished in that the outer rotational sleeve (14) has, on its inner contour, an inwardly pointing inner stop (20), and the inner rotational part (12) has, on its outer contour, an outwardly pointing counterstop (26) which consists of soft material, reduction of the inner radius (R:R1) of the inner contour of the outer rotational sleeve (14) in the region in front of the inner stop (20) enabling the outer contour of the counterstop (26) to come increasingly more strongly into contact with the inner wall of the outer rotational sleeve (14) during rotation from the first into the second position, as a result of which first of all a braking effect is built up, and, when the counterstop (26) strikes against the inner stop (20), the soft material of the counterstop (26) enables a cushioning effect to be produced.

11 Claims, 3 Drawing Sheets

CUSHIONING DEVICE FOR ROTATABLE COMPONENTS, SUCH AS, FOR EXAMPLE, ROOF GRAB HANDLES OR SUN VISORS OF A VEHICLE

This is a continuation of international application Serial No. PCT/DE01/01425, filed Apr. 11, 2001, the entire disclosure of which is hereby incorporated by reference.

Cushioning device for rotatable components, such as, for example, roof grab handles or sun vizors of a vehicle.

TECHNICAL FIELD

The present invention relates to a cushioning device for rotatable components, such as, for example, roof grab handles or sun vizors of a vehicle, having an outer rotational sleeve and an inner rotational part, which are both arranged in a manner such that they can rotate relative to each other about a common axis of rotation from a first rotational position into a second rotational position, either the inner rotational part being fixed and the outer rotational sleeve being rotatable or the outer rotational sleeve being fixed and the inner rotational part being rotatable.

Roof grab handles in vehicles are frequently designed as folding handles. Folding handles of this type are folded by hand from the inoperative position, i.e. from a position leaning against the roof lining, into a functional position. When let go, these folding handles automatically pivot back into the inoperative position.

Sun shielding vizors are also designed as foldable components. After a brief actuation by hand, said sun shielding vizors automatically pivot into the functional position. An automatic retracting pivoting movement can also be carried out when folding them back.

PRIOR ART

Folding handles having a handle strap are known, said strap, if let go in the functional position, striking under the effect of its restoring spring against the bearing bracket or the roof lining and in the process causing annoying noises, or over the course of time damage occurs reducing the functioning ability. Braking devices which damp the restoring movement of the folding handle have therefore been arranged on the folding handles mentioned at the beginning.

EP-A-0 569 022 describes a folding handle which is distinguished in that a braking spring is provided, said spring being arranged to counteract the restoring spring and in the inoperative position precisely compensating for the restoring spring, the inoperative position deviating by a safety angle which is substantially smaller than the handle angle from the end position in which the handle strap strikes against the bearing bracket or the associated installation wall, and the braking spring being effective only in the region of a braking angle between a brake usage position and the end position.

German utility model G 93 14 645.0 shows a pivoting joint primarily for components for vehicles, such as pivoting handles, comprising a bearing sleeve, which are connected in a rotationally fixed manner to a positionally fixed component, for example to a holder, or to a pivotable component, and a bolt which is mounted rotatably in the bearing sleeve and is connected in a rotationally fixed manner to the pivotable component or the positionally fixed component, and a viscosity brake, by means of which a pivoting movement of the parts with respect to one another, which movement is caused by gravitational force or by a spring element, is damped. As the viscosity brake in this case, a circumferential gap which is filled with a medium of high viscosity is formed between the bolt and the bearing sleeve.

German utility model 296 04 260.9 describes a folding handle which is distinguished in that the braking device is designed as a rotational damper and has a radial construction with an, in particular, cylindrical housing, a rotational piston which is sealed with respect to the housing, can be rotated within an annular body and plunges at least in some regions into the annular space filled with viscous medium, the housing has a central, continuous recess, within which the axis of rotation is arranged in some regions, the handle strap or the bolt is connected in a form-fitting manner to the housing of the braking device and the bearing bracket is connected in a form-fitting manner to the rotational piston of the braking unit, or vice versa, and the housing and the rotational piston are clipped together with the aid of a ring and annular groove and said housing and piston form a unit.

SUMMARY OF THE INVENTION

Starting from the prior art which has been mentioned, the present invention is based on the technical problem or object of specifying a cushioning device for rotatable components, which device shows a cushioning effect and a braking effect, is constructed from few parts, makes economic production possible and ensures reliable functioning in the long term.

The cushioning device according to the invention is given by the features of independent claim 1. An alternative cushioning device according to the invention is given by the features of independent claim 2. Advantageous refinements and developments are the subject matter of the dependent claims.

Accordingly, a first embodiment of the cushioning device according to the invention is distinguished in that the outer rotational sleeve has, on its inner contour, an inwardly pointing inner stop and the inner rotational part has, on its outer contour, an outwardly pointing counterstop which consists of soft material, reduction of the inner radius of the inner contour of the outer rotational sleeve in the region in front of the inner stop enabling the outer contour of the counterstop to come increasingly more strongly into contact with the inner wall of the outer rotational sleeve during rotation from the first into the second position, as a result of which first of all a braking effect is built up, and, when the counterstop strikes against the inner stop, the soft material of the counterstop enables a cushioning effect to be produced.

Accordingly, a second alternative refinement of the cushioning device according to the invention is distinguished in that the inner rotational part has, on its outer contour, an outwardly pointing counterstop, and the outer rotational sleeve has, on its inner contour, an inwardly pointing inner stop which consists of a soft material, enlargement of the outer radius of the outer contour of the inner rotational part in the region in front of the counterstop enabling the outer contour of the inner stop to come increasingly more strongly into contact with the outer wall of the inner rotational part during rotation from the first into the second position, as a result of which a braking effect is produced, and, when the inner stop strikes against the counterstop, the soft material of the inner stop enables a cushioning effect to be produced.

A braking and a cushioning effect can be reliably produced by the cushioning device according to the invention. The stop noise can be reliably suppressed. The braking effect used in front of the stop means that the components are treated carefully, which ensures reliable functioning in the long term with an increase in the service life of the components.

A further advantage of the cushioning device according to the invention resides in the fact that only two components are required in order to produce the desired, advantageous effects, namely the outer rotational sleeve with its inner stop and the inner rotational part with its counterstop.

An advantageous refinement which ensures economical production is distinguished in that the inner rotational part/the outer rotational sleeve is designed as a two-component plastic part having an injection-molded counterstop/inner stop made of soft material.

According to an advantageous development, the braking and cushioning effect is produced not only during pivoting from the first into the second position, but also the other way around when pivoting from the second position into the first position. This advantageous refinement is distinguished in that there is a further inner stop on the inner contour of the outer rotational sleeve, in the region of which stop the inner radius of the outer rotational sleeve is likewise reduced, with the result that the braking and cushioning effect is produced during rotation from the second position into the first position.

A particularly advantageous refinement of the cushioning device according to the invention is characterized in that on the outer side facing the region in contact with the inner wall of the outer rotational sleeve or the outer wall of the inner rotational part the counterstop/the inner stop has a projecting contour which, during the first contact with the opposite wall, initially produces, as seen in cross section, a point-shaped contact which becomes an extensive contact during further rotation. By virtue of the fact that the projecting contour which is selected enables the counterstop or the inner stop initially only to come into contact in a pointwise manner with the opposite wall and to only come to an extensive contact during further rotation, the braking force is built up more or less continuously.

A particularly preferred development of the cushioning device according to the invention is distinguished in that a retaining projection is integrally formed on the inner rotational part/on the outer rotational sleeve, which projection runs in the longitudinal direction and has recesses in the form of a grid in the longitudinal direction, and the counterstop/the inner stop is injection molded onto this retaining projection. By virtue of the fact that there is an additional retaining projection having recesses in the form of a grid, a reliable connection in the long term of the injection-molded counterstop or of the injection-molded inner stop made of soft material is ensured as a consequence of the form-fitting engagement.

As material for the soft counterstop or for the soft inner stop, use can be made, for example, of thermoplastic polyethylene (PE) or thermoplastic polyurethane (PU). Both the inner rotational part and the outer rotational sleeve are designed as plastic injection-molded parts.

A particularly advantageous refinement is distinguished in that the decrease of the inner diameter (R-R1) and the increase of the outer diameter (R2-R3) of the outer rotational sleeve or of the inner rotational part has a linear profile.

Further embodiments and advantages of the invention are produced by the features also cited in the claims and also by the exemplary embodiments specified below. The features of the claims can be combined with one another in any desired manner insofar as they obviously do not eliminate one another.

BRIEF DESCRIPTION OF THE DRAWING

The invention and advantageous embodiments and developments thereof will be described and explained in greater detail below with reference to the examples illustrated in the drawing. The features which are to be gathered from the description and the drawing may, according to the invention, be used individually on their own or a number of them may be used in any desired combination. In the drawing.

WAYS OF IMPLEMENTING THE INVENTION

Figure 1:
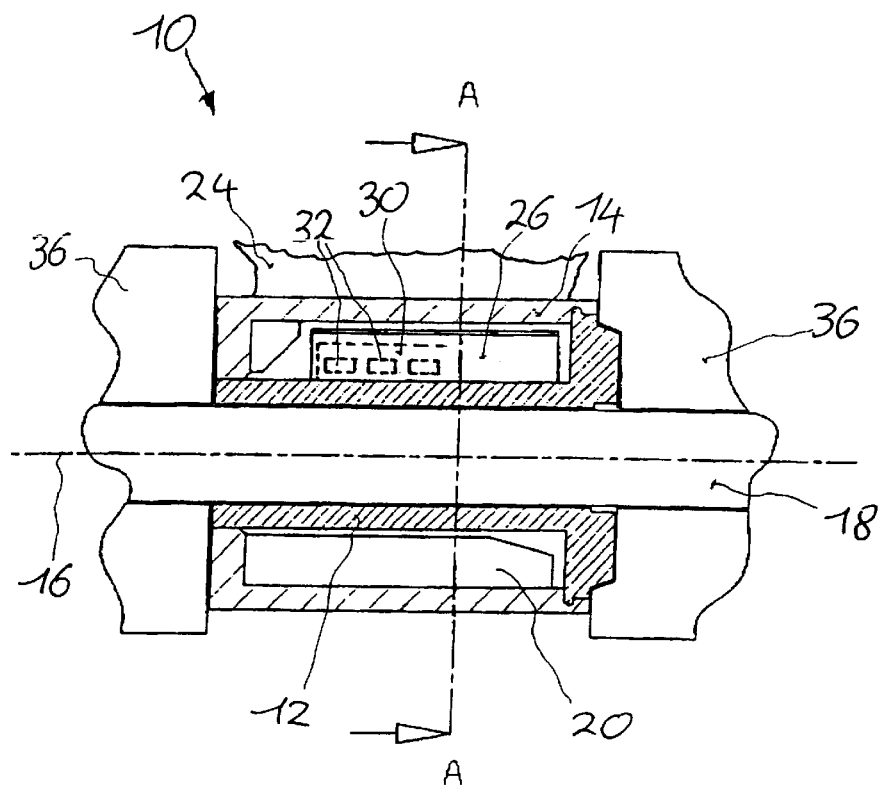
FIG. 1 shows a diagrammatic longitudinal section through a cushioning device having an outer rotational sleeve and an inner rotational part, a counterstop made of soft material being present on the inner rotational part and an inner stop being present on the outer rotational sleeve.
Figures 2, 3:
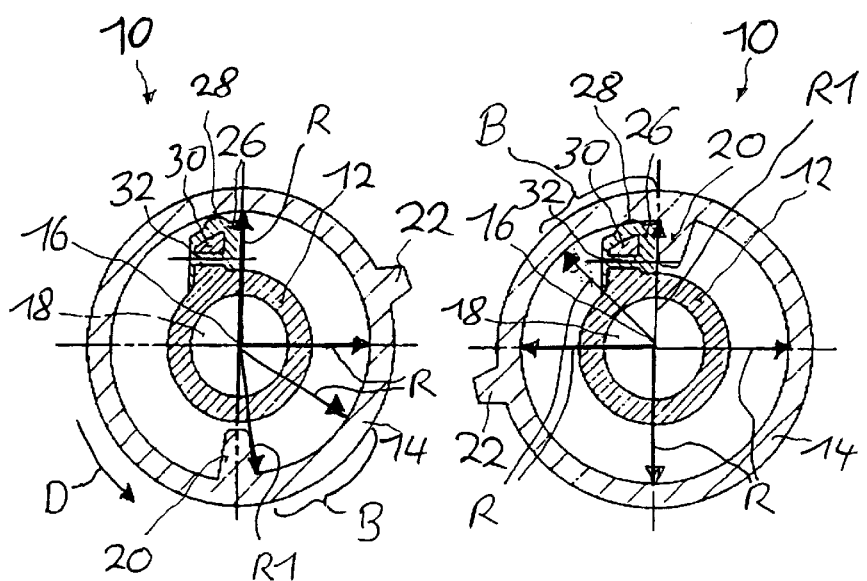
FIG. 2 shows a diagrammatic cross section through the cushioning device according to FIG. 1 in accordance with the sectional line A—A with the outer rotational sleeve rotated into the functional position.
FIG. 3 shows a diagrammatic cross section through the cushioning device according to FIG. 1 in accordance with the sectional line A—A in the stop position.

FIGS. 1 to 3 illustrate a cushioning device 10 which is used on a folding handle on the roof lining of a vehicle. The cushioning device 10 has an essentially cylindrical outer rotational sleeve 14 which is present in a manner such that it can rotate about an axis of rotation 16. Within the outer rotational sleeve 14 there is an inner rotational part 12 which is likewise designed as an essentially cylindrical sleeve. The inner rotational part 12 is pushed onto a bolt 18 which is mounted on a bearing bracket 36. At the same time, the inner rotational part 12 is connected fixedly to the bearing bracket 36. In FIG. 1, the bearing bracket 36 is shown only by way of indication.

The outer rotational sleeve 14 is connected in a rotationally fixed manner via an outer projection 22 to the handle strap 24 of a folding handle. The handle strap 24 is only indicated diagrammatically in FIG. 1. By means of the connection to the outer rotational sleeve 14, the handle strap 24 of the folding handle is present in a manner such that it can rotate about the axis 16.

An inwardly pointing inner stop 20 is integrally formed on the outer rotational sleeve 14. The outer rotational sleeve 14 is designed as a plastic injection-molded part, polyamide (PA) being selected as the material in the exemplary embodiment.

The inner rotational part 12 has a counterstop 26 which is integrally formed on the outer contour. This counterstop 26 is made of soft plastic material, for example thermoplastic polyethylene (PE) or thermo-plastic. polyurethane (PU). In principle, a material having elastomeric properties is possible. In the region of the counterstop 26, a retaining projection 30 having recesses 32 present in the form of a grid in the longitudinal direction is integrally formed on the inner rotational part 12 and the counterstop 26 is injection molded around said retaining projection. This additionally results in a form-fitting engagement of the injection-molded counterstop 26 with the retaining projection 30, which ensures reliable functioning in the long term.

In addition, there is a projecting contour 28 on that outer side of the counterstop 26 which faces the inner wall of the outer rotational sleeve 14.

The inner wall of the outer rotational sleeve 14 has a radius R in wide parts. In the region in front of the inner stop 20—as seen anticlockwise (see FIGS. 2 and 3)—the radius R decreases linearly to a value R1 directly in front of the inner stop 20. The radius R is dimensioned in such a manner that the counterstop 26 does not come into contact in this region with the inner wall of the outer rotational sleeve 14.

FIG. 2 illustrates the cushioning device in a first position in which the counterstop 26 is not in contact with the inner wall of the outer rotational sleeve 14. If the outer rotational sleeve 14 is then pivoted back anticlockwise (arrow D) as a consequence of the handle strap 24 of the folding handle being pivoted back owing to a spring (not illustrated), then at the beginning of the region B with a reduced radius of the inner wall of the outer rotational sleeve 14 the projecting contour 28, as seen in cross section, initially comes into contact in a point-shaped manner with the inner wall of the outer rotational sleeve 14. The first braking effect already arises here. With increasing further rotation, the contact surface between the counterstop 26 of the inner rotational part 12 and the inner wall of the outer rotational sleeve 14 becomes more extensive, as a result of which the braking force is further increased. Finally, the counterstop 26 and inner stop 20 strike against each other, in which case the soft material of the counterstop 26 and the braking effect which has previously occurred enable striking noise to be suppressed and, taken as a whole, no great forces have to be absorbed during the striking itself, which increases the service life of the components.

A great advantage of the cushioning device illustrated is the fact that only two components, namely the inner rotational part 12 and the outer rotational sleeve 14, have to be fitted in order to provide a cushioning device which has a reliable braking and cushioning effect.

Figure 4:
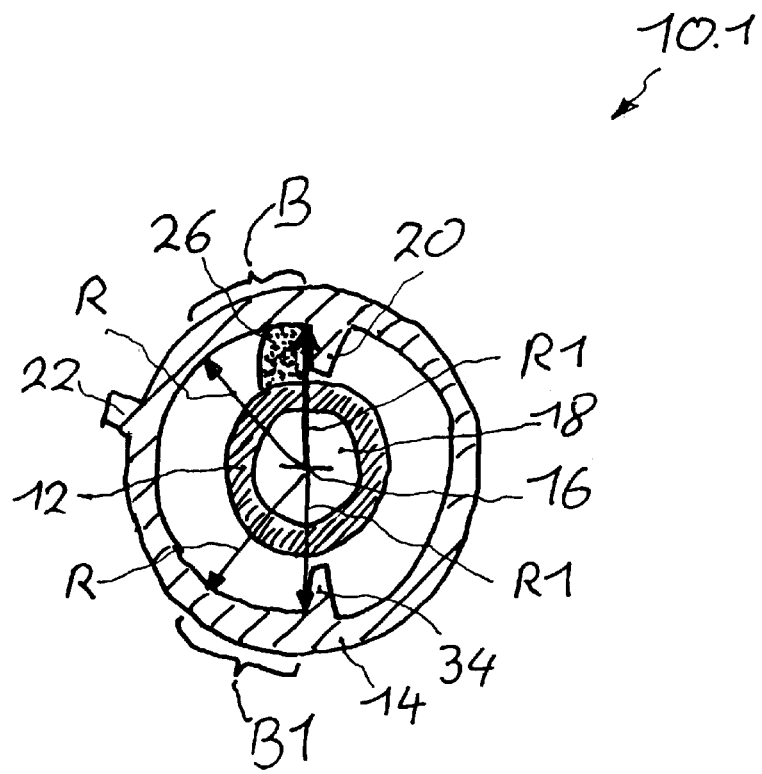
FIG. 4 shows a diagrammatic section through a cushioning device according to FIG. 1 supplemented by a further inner stop in a first stop position.
Figure 5:
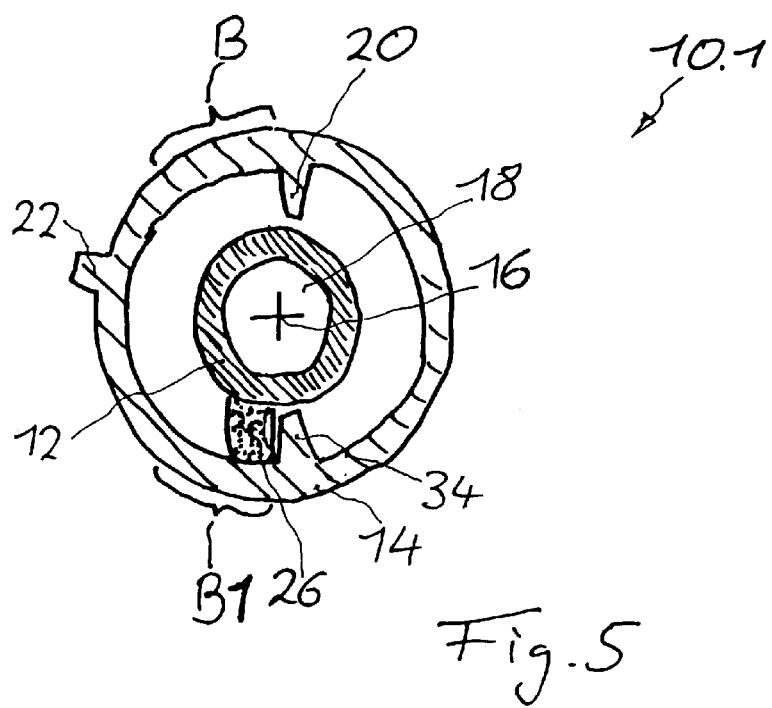
FIG. 5 shows a diagrammatic cross section through the cushioning device according to FIG. 4 in a second stop position.

FIGS. 4 and 5 illustrate a further exemplary embodiment of a cushioning device 10.1. This cushioning device 10.1 is largely identical with the cushioning device 10. Identical components bear the same reference number and will not be explained again. One difference over the cushioning device 10 is that in the case of this selected exemplary embodiment, the inner rotational part 12 is present in a rotatable manner and the outer rotational sleeve 14 is present in a rotationally fixed manner. A further difference is also the fact that there is a further inner stop 34 virtually opposite the inner stop 20, after which further inner stop a further region B1 is present, as seen clockwise, with a reduced radius of the inner wall of the outer rotational sleeve 14. In the case of this exemplary embodiment, the braking and cushioning effect is produced both when pivoting from the first into the second position and from the second into the first position.

Figure 6:
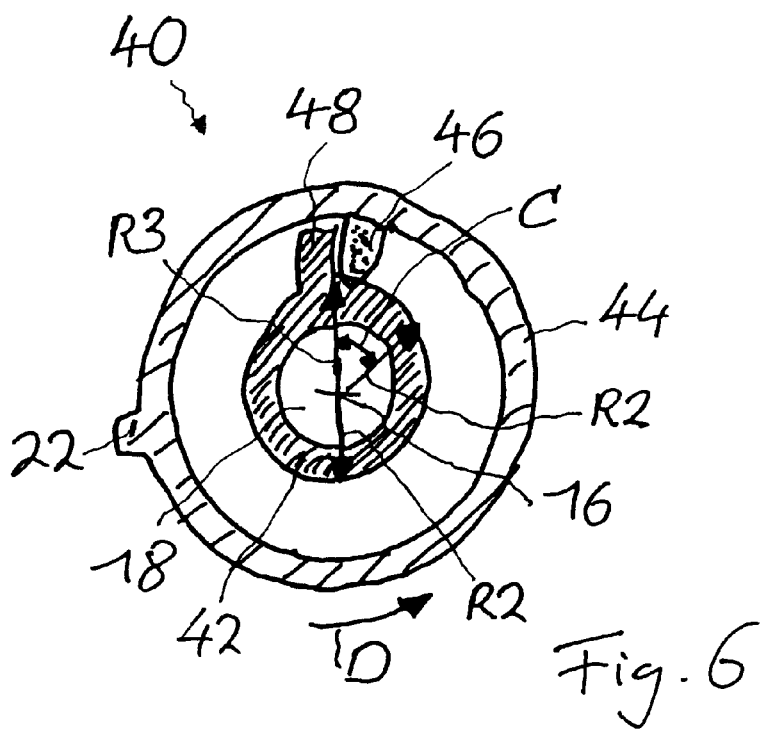
FIG. 6 shows a diagrammatic cross section through a cushioning device with an inner rotational part and an outer rotational sleeve, the outer rotational sleeve having a soft inner stop and the inner rotational part having a counterstop.

FIG. 6 illustrates a further exemplary embodiment of a cushioning device 40. The latter has an essentially cylindrical outer rotational sleeve 44, within which there is an essentially cylindrical inner rotational part 42. The two components are present about a common axis of rotation 16. The inner rotational part 42 is arranged on a bolt 18.

The outer rotational sleeve 44 furthermore has an outwardly pointing outer projection 22 for the form-fitting fastening to a rotational part (not illustrated in greater detail). The inner rotational part 42 is connected fixedly, for example, to a bearing bracket (not illustrated) of the rotational part.

A counterstop 48 is integrally formed on the outer contour of the inner rotational part 42. The inner rotational part 42 largely has an identical outer diameter R2. In the region in front of the counterstop 48—as seen clockwise—the outer diameter is designed such that it is continuously enlarged from the size R2 to the size R3. The inner rotational part 42 is designed as a plastic injection-molded part.

An inner stop 46 made of soft plastic material is injection molded onto the inner wall of the outer rotational sleeve 44. The outer rotational sleeve 44 is also designed as an injection-molded plastic component.

The inner stop 46 corresponds in terms of its design essentially to the counterstop 26 from the cushioning device 10. It is designed in such a manner that it does not come into contact with the outer contour of the inner rotational part 42 in the radius region R2. In the region having an enlarged outer diameter (reference symbol C), the inner stop 46 comes increasingly more strongly into contact with the outer wall of the inner rotational part 42, as a result of which a braking effect occurs during a rotational movement D which is present. In the end position, the inner stop 46 comes into contact with the counterstop 48, the soft material used for the inner stop 46 enabling a cushioning effect to be produced when striking occurs.

The region B or C can be present in a circumferential region of less than 45° (degrees).

The exemplary embodiments show cushioning devices for pivotable roof grab handles. However, the cushioning device can also be used without any problem for other pivotable components, such as, for example, sun vizors, covers for compartments accommodating spectacles or the like.

What is claimed is:

1. A cushioning device for rotatable components, such as, for example, roof grab handles or sun vizors of a vehicle, having an outer rotational sleeve, an inner rotational part, which are both arranged in a manner such that they can rotate relative to each other about a common axis of rotation from a first rotational position into a second rotational position, either the inner rotational part being fixed and the outer rotational sleeve being rotatable or the outer rotational sleeve being fixed and the inner rotational part being rotatable, characterized in that the outer rotational sleeve has, on its inner contour, an inwardly pointing inner stop, the inner rotational part has, on its outer contour, an outwardly pointing counterstop which consists of soft material, reduction of the inner radius of the inner contour of the outer rotational sleeve formed in the region in front of the inner stop enabling the outer contour of the counterstop to come increasingly more strongly into contact with the inner wall of the outer rotational sleeve during rotation from the first into the second position, as a result of which first of all a braking effect is built up, and, when the counterstop strikes against the inner stop, the soft material of the counterstop enables a cushioning effect to be produced.

2. A cushioning device for rotatable components, such as, for example, roof grab handles or sun vizors of a vehicle, having an outer rotational sleeve, an inner rotational part, which are both arranged in a manner such that they can rotate relative to each other about a common axis from a first rotational position into a second rotational position, either the inner rotational part being fixed and the outer rotational sleeve being rotatable or the outer rotational sleeve being fixed and the inner rotational part being rotatable, and the inner rotational part having a region with increasing enlargement of the outer radius, characterized in that the inner rotational part has, on its outer contour, an outwardly pointing counterstop, the outer rotational sleeve has, on its inner contour, an inwardly pointing inner stop which consists of a soft material, enlargement of the outer radius of the outer contour of the inner rotational part formed in the region in front of the couterstop enabling the outer contour of the inner stop to come increasingly more strongly into contact with the outer wall of the inner rotational part during rotation from the first into the second position, as a result of which a braking effect is produced, and, when the inner stop strikes against the counterstop, the soft material of the inner stop enables a cushioning effect to be produced.

3. The cushioning device as claimed in claim 1 or 2, characterized in that the inner rotational part/the outer rotational sleeve is designed as a two-component plastic part having an injection-molded counterstop/inner stop made of soft material.

4. The cushioning device as claimed in claim 3, characterized in that there is a further inner stop on the inner contour of the outer rotational sleeve, in the region of which stop the inner radius of the outer rotational sleeve is likewise reduced, with the result that the braking and cushioning effect is produced during rotation from the second position into the first position.

5. The cushioning device as claimed in claim 3, characterized in that on the outer side facing the region in contact with the inner wall of the outer rotational sleeve or the outer wall of the inner rotational sleeve or the outer wall of the inner rotational part the counterstop/the inner stop has a projecting contour which, during the first contact with the opposite wall, initially produces, as seen in cross section, a point-shaped contact which becomes an extensive contact during further rotation.

6. The cushioning device as claimed in claim 1 or 2, characterized in that there is a further inner stop on the inner contour of the outer rotational sleeve, in the region of which stop the inner radius of the outer rotational sleeve is likewise reduced, with the result that the braking and cushioning effect is produced during rotation from the second position into the first position.

7. The cushioning device as claimed in claim 1 or 2, characterized in that on the outer side facing the region in contact with the inner wall of the outer rotational sleeve or the outer wall of the inner rotational sleeve or the outer wall of the inner rotational part the counterstop/the inner stop has a projecting contour which, during the first contact with the opposite wall, initially produces, as seen in cross section, a point-shaped contact which becomes an extensive contact during further rotation.

8. The cushioning device as claimed in claim 1 or 2, characterized in that a retaining projection is integrally formed on the inner rotational part/on the outer rotational sleeve, which projection runs in the longitudinal direction and has recesses in the form of a grid in the longitudinal direction, and the counterstop/the inner stop is injection molded onto this retaining projection.

9. The cushioning device as claimed in claim 1 or 2, characterized in that the inner rotational part/the outer rotational sleeve consists of polyamide and the counterstop/inner stop consists of thermoplastic polyethylene or polyurethane.

10. The cushioning device as claimed in claim 1 or 2, characterized in that the inner rotational part is designed as an inner rotational sleeve which is pushed onto a bolt and which is fastened to a bearing bracket of a rotatable component, in particular roof grab handle, and the outer rotational sleeve is fastened to the rotatable component.

11. The cushioning device as claimed in claim 1 or 2, characterized in that the reduction of the inner diameter of the outer rotational sleeve and the increase of the outer diameter of the inner rotational part has a linear profile.

\* \* \* \* \*